(12) United States Patent
Toyooka (10) Patent No.: US 12,189,119 B2
(45) Date of Patent: Jan. 7, 2025

(54) IMAGING DEVICE

(71) Applicant: 3M INNOVATIVE PROPERTIES COMPANY, St. Paul, MN (US)

(72) Inventor: Kazuhiko Toyooka, Yamagata (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 311 days.

(21) Appl. No.: 16/759,459

(22) PCT Filed: Oct. 31, 2018

(86) PCT No.: PCT/IB2018/058557
§ 371 (c)(1),
(2) Date: Apr. 27, 2020

(87) PCT Pub. No.: WO2019/087109
PCT Pub. Date: May 9, 2019

(65) Prior Publication Data
US 2020/0292807 A1    Sep. 17, 2020

(30) Foreign Application Priority Data
Oct. 31, 2017 (JP) .................. 2017-210696

(51) Int. Cl.
G02B 27/00    (2006.01)
B60R 11/04    (2006.01)

(52) U.S. Cl.
CPC .......... *G02B 27/0018* (2013.01); *B60R 11/04* (2013.01); *G02B 2207/123* (2013.01)

(58) Field of Classification Search
CPC .......... G02B 27/0018; G02B 2207/123; B60R 11/04

USPC ........................................... 359/613
See application file for complete search history.

(56) References Cited

U.S. PATENT DOCUMENTS

| 6,398,370 B1* | 6/2002 | Chiu ............... G02B 5/003 428/167 |
| 8,503,122 B2 | 8/2013 | Liu |
| 2005/0001901 A1 | 1/2005 | Eggers |
| 2007/0160811 A1* | 7/2007 | Gaides ............ G02B 5/003 428/173 |
| 2007/0237490 A1* | 10/2007 | Reininger ........ G02B 6/06 385/147 |
| 2009/0033912 A1 | 2/2009 | Sasaki |

(Continued)

FOREIGN PATENT DOCUMENTS

| JP | H11-78737 | 3/1999 |
| JP | 20082038192 A2 | 9/2008 |

(Continued)

OTHER PUBLICATIONS

International Search Report for PCT International Application No. PCT/IB2018/058557, mailed on Feb. 25, 2019, 3 pages.

*Primary Examiner* — Joseph G Ustaris
*Assistant Examiner* — Jimmy S Lee
(74) *Attorney, Agent, or Firm* — Jonathan L. Tolstedt (57) ABSTRACT

An imaging device is provided including an imaging unit configured to capture an image, and a louver film placed in a visual field of the imaging unit. The louver film includes a light transmissive unit and a non-transmissive unit which are alternately placed. The imaging unit and the louver film are placed so that the optical axis of the imaging unit intersects a principal plane of the louver film.

4 Claims, 7 Drawing Sheets

(56) References Cited

U.S. PATENT DOCUMENTS

| | | | | |
|---|---|---|---|---|
| 2009/0097124 | A1* | 4/2009 | Lundgren | G02B 27/0018 |
| | | | | 359/601 |
| 2011/0261462 | A1 | 10/2011 | Hahn | |
| 2012/0026592 | A1* | 2/2012 | Reininger | G02B 13/06 |
| | | | | 359/619 |
| 2012/0327341 | A1* | 12/2012 | Honda | G02F 1/133308 |
| | | | | 349/122 |
| 2013/0329045 | A1 | 12/2013 | Choi | |
| 2017/0270381 | A1* | 9/2017 | Itoh | B60S 1/0844 |

FOREIGN PATENT DOCUMENTS

| | | |
|---|---|---|
| JP | 2010-060754 | 3/2013 |
| JP | 2013-246323 | 12/2013 |
| JP | 2013-255064 | 12/2013 |

* cited by examiner

| | LOUVER FILM | BOARD | CAMERA CONDITION |
|---|---|---|---|
| COMPARATIVE EXAMPLE 1 | NONE | PRESENT (MUCH STRAY LIGHT) | 1/64 ND1.5% |
| EXAMPLE 1 | THICKNESS 250 μm | PRESENT (MUCH STRAY LIGHT) | 1/64 ND1.5% |
| EXAMPLE 2 | THICKNESS 180 μm | PRESENT (MUCH STRAY LIGHT) | 1/64 ND1.5% |
| COMPARATIVE EXAMPLE 2 | NONE | NONE (LITTLE STRAY LIGHT) | 1/64 ND1.5% |
| EXAMPLE 3 | THICKNESS 250 μm | NONE (LITTLE STRAY LIGHT) | 1/64 ND1.5% |
| EXAMPLE 4 | THICKNESS 180 μm | NONE (LITTLE STRAY LIGHT) | 1/64 ND1.5% |

| COMAPARATIVE EXAMPLE 1 | EXAMPLE 1 | EXAMPLE 2 |
|---|---|---|
| 3.67 | 1.41 | 2.77 |
| COMAPARATIVE EXAMPLE 2 | EXAMPLE 3 | EXAMPLE 4 |
| 3.76 | 1.41 | 2.76 |

*Fig. 7*

IMAGING DEVICE

CROSS REFERENCE TO RELATED APPLICATIONS

This application is a national stage filing under 35 U.S.C. 371 of PCT/IB2018/058557, filed Oct. 31, 2018, which claims the benefit of Japanese Application No. 2017-210696, filed Oct. 31, 2017, the disclosure of which is incorporated by reference in its/their entirety herein.

TECHNICAL FIELD

The present invention relates to an imaging device.

BACKGROUND ART

There has been a conventionally known imaging device for capturing an image, for example, an imaging device disclosed in Patent Document 1. The imaging device disclosed in Patent Document 1 includes a shielding member for blocking light from the interior of a vehicle. The shielding member is placed between the interior space of the vehicle in which a driver exists and a space in which an imaging unit is placed.

Prior art includes PCT International Application Publication No. JP-T-2011-513126.

SUMMARY OF THE INVENTION

The above-described imaging device cannot provide a sufficient countermeasure for stray light entering the imaging unit. Thus, there is a need for reducing stray light entering the imaging unit.

An aspect of the present invention is an imaging device including an imaging unit configured to capture an image, and a louver film placed in a visual field of the imaging unit, the louver film having a light transmissive unit and a non-transmissive unit which are alternately placed, wherein the imaging unit and the louver film are placed such that the optical axis of the imaging unit intersects a principal plane of the louver film.

According to the present invention, stray light entering the imaging unit can be reduced.

DESCRIPTION

Detailed descriptions of various embodiments of an imaging device according to the present invention are given below with reference to the attached drawings. Note that, in the descriptions of the drawings, the same reference symbols have been assigned to the same elements, and that redundant descriptions thereof have been omitted.

Figure 1:
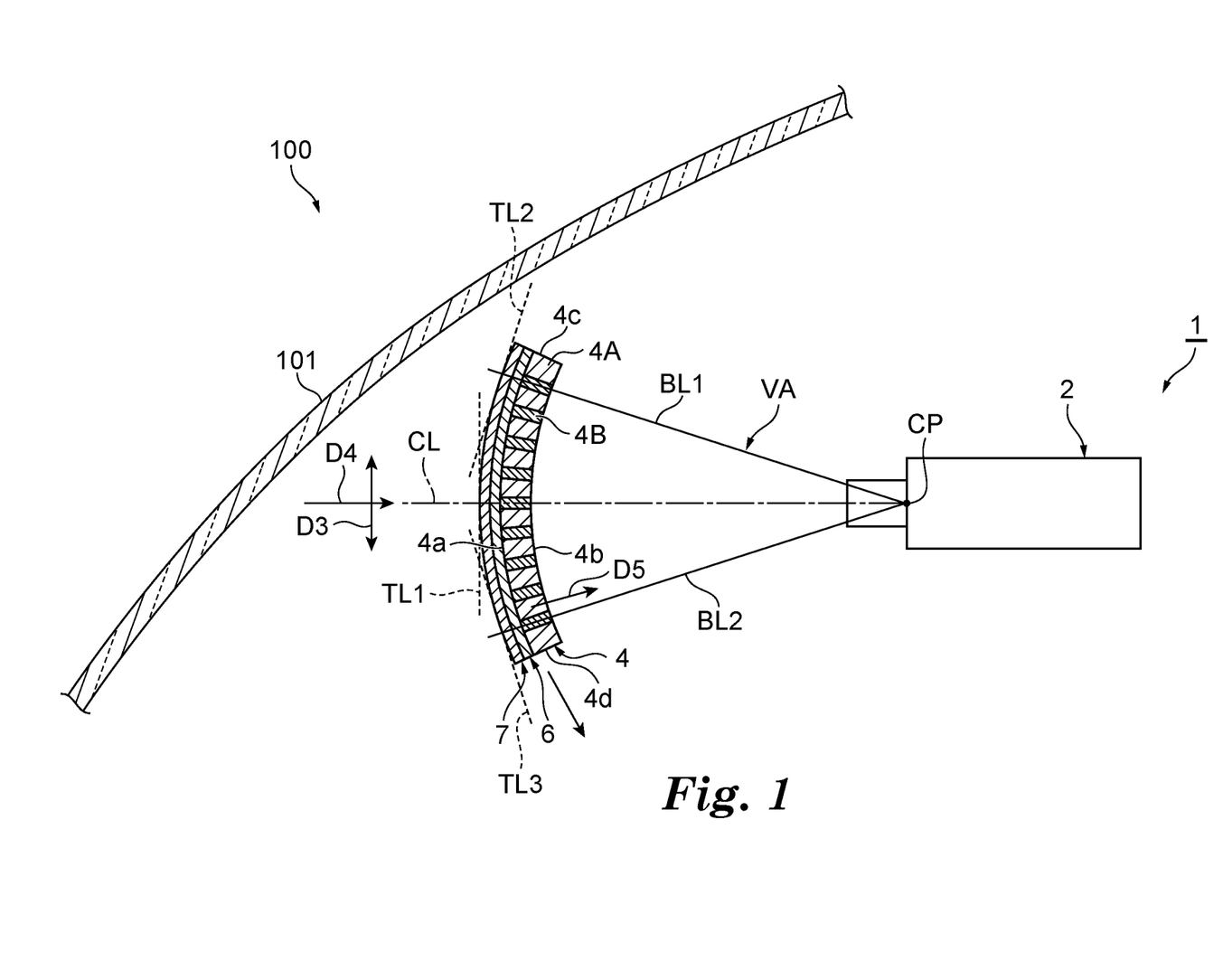
FIG. 1 is a schematic diagram illustrating a configuration of an imaging device according to an embodiment of the present invention.

FIG. 1 is a schematic diagram illustrating a configuration of an imaging device according to an embodiment of the present invention. As illustrated in FIG. 1, an imaging device 1 includes an imaging unit 2 and a louver film 4. The imaging device 1 is mounted inside a windshield 101 of a vehicle 100. The imaging device 1 may be attached to a position where the imaging device 1 will not obstruct the driver, in a vicinity of a roof in the vehicle 100. Further, the imaging unit 2 and the louver film 4 may be accommodated together in a case or the like, or accommodated in different cases, respectively, or placed without being accommodated in a case. It is noted that the imaging device 1 may be mounted not only in vehicles but also in security cameras, monitoring cameras, and any other type of cameras.

The imaging unit 2 is a device configured to capture an image. The imaging unit 2 includes a camera such as a known CCD imaging element. It is noted that the camera included in the imaging unit 2 is not limited to the CCD imaging element type, and any type of camera which can capture an image may be used. The imaging unit 2 can monocularly view (capture) traveling environment in front of the vehicle via the windshield 101. The imaging unit 2 have a visual field VA over a certain angular range with respect to an optical axis CL. The imaging unit 2 can acquire an image within the visual field VA. The visual field VA is a region expanding radially from the lens of the imaging unit 2.

The louver film 4 is a film including a light transmissive unit 4A and a non-transmissive unit 4B placed alternately. The louver film 4 has a property of transmitting light entering from the normal direction of the film and a direction generally parallel to the non-transmissive unit 4B (for example, from ±45 degrees with respect to the normal direction of the film), and blocking light entering from the other direction. The louver film 4 is placed in the visual field VA of the imaging unit 2. The imaging unit 2 and the louver film 4 are placed such that the optical axis CL of the imaging unit 2 intersects a principal plane of the louver film 4. The term "intersect" means a state in which the optical axis CL and the principal plane are not parallel but are mutually intersected. An angle between the optical axis CL and the principal plane is not especially limited, but the range of the angle may be 90°±35°. Further, the optical axis CL of the imaging unit 2 may be substantially orthogonal (at an angle close to 90°, where angular deviation due to an installation error and the like is allowed) to the principal plane of the louver film 4.

Figure 2A:
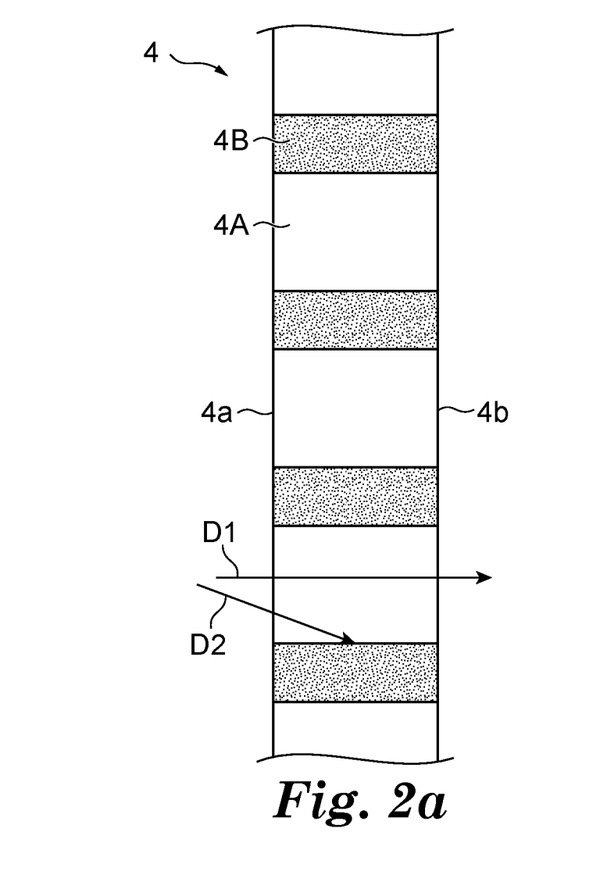
FIGS. 2A and 2B is an enlarged view of a louver film.
Figure 2B:
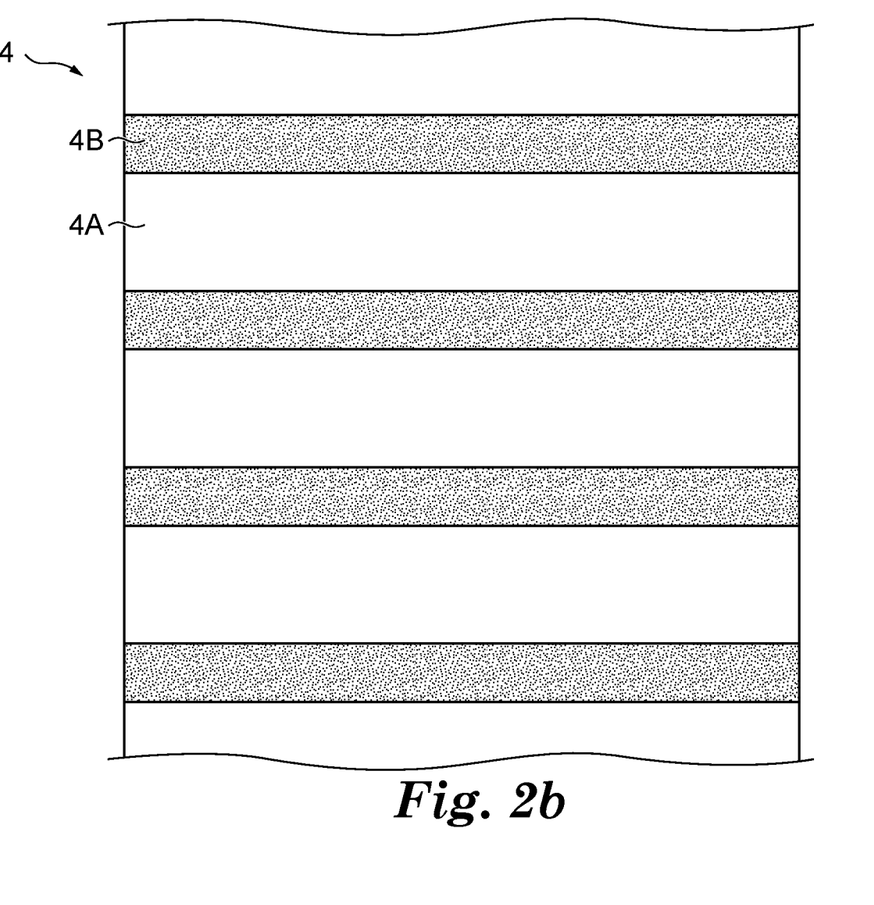

As illustrated in FIGS. 2A and 2B, in the louver film 4, minute non-transmissive units 4B, which are referred to as louver, are incorporated in the transmissive unit 4A made of, for example, a polymer resin having high transparency. The non-transmissive units 4B are provided in the transmissive unit 4A at fixed intervals in a direction (the vertical direction in FIGS. 2A and 2B, hereinafter, the direction may be referred to as "array direction") in the surface direction. In the embodiment illustrated in FIGS. 2A and 2B, the non-transmissive unit 4B is formed throughout the thickness of the transmissive unit 4A. Further, a plurality of the non-transmissive units 4B extend in parallel to each other along a direction orthogonal to the array direction.

In the louver film 4, the non-transmissive unit 4B blocks light entering diagonally from the outside of the vehicle. In other words, light incident from the orthogonal direction or at a smaller inclination angle with respect to a principal plane 4a of the louver film 4 (light advancing in the direction denoted as D1 in the figure) is transmitted through the transmissive unit 4A, and emitted from a principal plane 4b. On the other hand, the light diagonally incident at an angle equal to or greater than a certain angle with respect to the principal plane 4a (the light advancing in the direction denoted as D2 in the figure) is blocked by the non-transmissive unit 4B. It is noted that light entering from a portion of the principal plane 4a where the non-transmissive unit 4B is located is blocked at the position of the principal plane 4a. In this way, the louver film 4 has a function of limiting an advancing direction of light transmitted through the transmissive unit 4A to a certain emission angle range, thereby providing a uniform brightness distribution.

The transmissive unit 4A in the louver film 4 may be formed of a polymer resin having high transparency. Various types of resins used for the polymer resin may include a thermoplastics resin, a thermosetting resin and an energy beam curable resin including ultraviolet ray, and the examples thereof may include a cellulose resin such as cellulose acetate butyrate and triacetylcellulose; a polyolefin resin such as polyethylene and polypropylene; a polyester resin such as polyethylene terephthalate; polystyrene; polyurethane; vinyl chloride; an acrylic resin; polycarbonate resin; and a silicone resin.

On the other hand, the non-transmissive unit 4B includes a light shielding material capable of absorbing or reflecting light. Examples of such light shielding material can include (1) a dark-color pigment or a dark-color dye such as black and gray, (2) a metal such as aluminum and silver, (3) a dark-color metal oxide, and (4) the above-described polymer resin containing a dark-color pigment or a dark-color dye.

It is preferable that in the louver film 4, a width of the transmissive unit 4A, that is, a width of the polymer resin part between the non-transmissive units 4B, is larger than the width of the non-transmissive unit 4B so that a light transmittance rate of a whole of the louver film 4 may not decrease. The width of the transmissive unit 4A may be from 20 to 500 μm, and may be from 40 to 200 μm. The width of the non-transmissive unit 4B may be from 0.5 to 100 μm, and may be from 1 to 50 μm. Further, normally, an angle of the non-transmissive unit 4B may be in the range of from 0 to 45°. Note that the angle of the non-transmissive unit 4B means an angle relative to the principal plane 4a of the louver film 4, where a state where the non-transmissive unit 4B is perpendicular to the principal plane 4a (state illustrated in FIGS. 2(a), 2(b)) is 0 degree.

Such a louver film 4 may be manufactured as follows, for example. A layer containing a light shielding material is laminated on one of the principal planes of polymer films used for the transmissive unit 4A to form a laminate formed of polymer film/light shielding material. A plurality of such laminates are prepared, and are further laminated to form a louver film precursor in which the polymer film and the light shielding material are alternatively arrayed and fixed to each other. Next, along a direction perpendicular to the principal plane of the precursor, that is, along a laminate direction or a thickness direction, the precursor is sliced into a predetermined thickness. As a result, the louver film 4 is completed. Alternatively, for the louver film 4, a commercially available product such as 3M™ light control film manufactured by 3M Japan Limited may also be employed.

Figure 3:
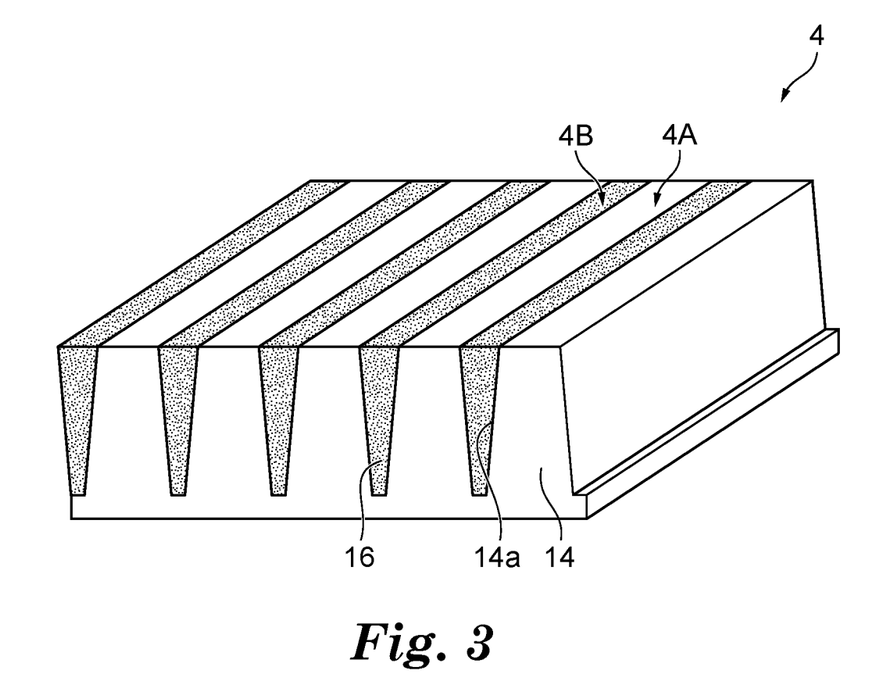
FIG. 3 is an enlarged view of a variation of the louver film.

Note that a configuration (and a manufacturing method) of the louver film 4 may not be limited to that illustrated in FIGS. 2A and 2B. For example, the louver film 4 illustrated in FIG. 3 may also be employed. The louver film 4 illustrated in FIG. 3 is configured by preparing a light transmissive base member 14 having a plurality of grooves 14a arrayed parallel to one another and filling a light-absorbent material or a light-reflective material into the grooves 14a. In this case, the non-transmissive unit 4B extends to a halfway position in the thickness direction of the transmissive unit 4A.

Returning to FIG. 1, a polarizing layer 6 and an antireflection layer 7 are provided on the principal plane 4a placed on the opposite side of the imaging unit 2, out of the principal planes 4a, 4b of the louver film 4. Note that at least one of the polarizing layer 6 and the antireflection layer 7 may be provided or both thereof may be omitted. The polarizing layer 6 has a function of allowing only light polarized into a certain direction to pass through and blocking the other light. The polarizing layer 6 may be configured of any type of polarizing films, including absorption type, reflection type, and circular polarization type. Materials of the polarizing layer 6 may include a polyvinyl resin, a cellulose resin, an acrylic resin, a polyester resin, an epoxy resin, a polyurethane resin, a polyamide resin, a polyolefin resin, a silicone resin, a polycarbonate resin, and the like. A thickness of the polarizing layer 6 may be set to 10 to 400 μm. The antireflection layer 7 has a function of preventing a light reflection on the principal plane 4a of the louver film 4. Materials of the antireflection layer 7 to be employed may include a polyvinyl resin, a cellulose resin, an acrylic resin, a polyester resin, an epoxy resin, a polyurethane resin, a polyamide resin, a polyolefin resin, a silicone resin, a polycarbonate resin, and the like. A thickness of the antireflection layer 7 may be set to 10 to 300 μm.

In a state where the louver film 4 is placed at a position facing the imaging unit 2, the non-transmissive unit 4B of the louver film 4 may extend along a horizontal direction. Note that the non-transmissive unit 4B may not extend to run perfectly parallel to the horizontal direction, and may be included from the horizontal direction within an error margin during the arrangement. Note that in an in-plane direction, a plurality of non-transmissive units 4B extend in parallel in a direction perpendicular to the array direction (direction indicated by D3 in FIG. 1) (see FIGS. 2A and 2B). Therefore, when the non-transmissive units 4B are placed to extend along the horizontal direction, the array direction D3 extends along a vertical direction. Further, the direction in which the non-transmissive unit 4B extends is not particularly limited, and the louver film 4 may be placed to be included relative to a horizontal direction, and the louver film 4 may be placed to extend in the vertical direction.

As seen from a direction perpendicular to the array direction D3 of the transmissive unit 4A and the non-transmissive unit 4B, and the light transmission direction of the louver film 4 (the direction indicated by D4 in FIG. 1) (the forward-backward direction in the sheet of FIG. 1 or a direction in which the non-transmissive unit 4B extends), the louver film 4 is placed in a curved state allowing the louver film 4 to be closer to the imaging unit 2 as farther away from the optical axis CL toward the outer peripheral side. That is, a central part of the louver film 4 is placed toward the opposite side of the imaging unit 2, and an upper end 4a and a lower end 4d of the louver film 4 are placed toward the imaging unit 2. The louver film 4 includes a curved shape protruding toward the opposite side of the imaging unit 2. Note that the louver film 4 may extend while maintaining the curved shape illustrated in FIG. 1, in a direction perpendicular to the array direction D3 and the transmission direction D4.

The degree by which the louver film 4 is curved is not particularly limited, and for example, the louver film 4 may be curved as follows. Note that in the following description, a tangential line and the like are set with a state seen from the direction perpendicular to the array direction D3 and the transmission direction D4 as a reference. A tangential line TL1 is set with respect to an intersection point of the optical axis CL and an external surface of the antireflection layer 7 (or the principal plane 4a of the louver film 4). At this time, the optical axis CL and the tangential line TL1 may intersect at 90° or may be inclined within a range of about ±35° with respect to 90°. A tangential line TL2 is set with respect to an intersection point of an upper boundary line BL1 of the visual field VA of the imaging unit 2 and the external surface of the antireflection layer 7 (or the principal plane 4a of the louver film 4). At this time, the boundary line BL1 and the tangential line TL2 may intersect at 90° or may be inclined within a range of about ±35° with respect to 90°. A tangential line TL3 is set with respect to an intersection point of an upper boundary line BL2 of the visual field VA of the imaging unit 2 and the external surface of the antireflection layer 7 (or the principal plane 4a of the louver film 4). At this time, the boundary line BL2 and the tangential line TL3 may intersect at 90° or may be inclined within a range of about ±35° with respect to 90°. Alternatively, when a reference point CP is set for the intersection point of the optical axis CL and the boundary lines BL1 and BL2, the principal plane 4a of the louver film 4 may be curved with a constant curvature radius with respect to the reference point CP. Note that the curvature radius of the principal plane 4a with respect to the reference point CP may be perfectly constant, and it is sufficient that the difference between the curvature radius with respect to the optical axis CL and the curvature radius with respect to the BL1 and BL2 is within a range of about 25%.

Next, an operation and effect of the imaging device 1 according to the present embodiment will be described.

The imaging device 1 according to the present embodiment includes the imaging unit 2 configured to capture an image, and the louver film 4 placed in the visual field VA of the imaging unit 2. The louver film 4 includes the transmissive unit 4A and the non-transmissive unit 4B which are alternately placed. The imaging unit 2 and the louver film 4 are placed so that the optical axis CL of the imaging unit 2 intersects the principal planes 4a and 4b of the louver film 4.

Such imaging device 1 includes the louver film 4 having the transmissive unit 4A and non-transmissive unit 4B, which are placed alternately. The louver film 4 can block light such as stray light entering at a large inclination angle by the non-transmissive unit while transmitting light entering at a small inclination angle with respect to the principal plane 4a through the transmissive unit 4A. The imaging unit 2 and the louver film 4 are placed such that the optical axis CL of the imaging unit 2 faces the principal planes 4a and 4b of the louver film 4. Thus, the louver film 4 can block stray light directed toward the imaging unit 2. Therefore, it is possible to reduce stray light entering the imaging unit.

In the imaging device 1, as seen from a direction perpendicular to the array direction D3 of the transmissive unit 4A and the non-transmissive unit 4B and the light transmission direction D4 of the louver film 4, the louver film 4 is placed in a curved state allowing the louver film 4 to be closer to the imaging unit 2 as farther away from the optical axis CL toward the outer peripheral side. Light entering toward a region at the side of the outer circumference in the visual field VA of the imaging unit (for example, light traveling in a direction D5 in FIG. 1) is inclined with respect to the optical axis CL. As described above, when the louver film 4 is placed in the curved configuration, the transmissive unit 4A can transmit light inclined with respect to the optical axis CL (for example, light traveling in the direction D5) at a position of the louver film 4 away from the optical axis. Furthermore, light strongly inclined with respect to the light to be transmitted can be blocked by the non-transmissive unit 4B. Thus, the louver film 4 can appropriately transmit/block light in accordance with the distance from the optical axis CL.

In the imaging device 1, at least one of a polarizing layer and an antireflection layer is provided on the principal plane placed on the opposite side of the imaging unit, of the principal planes of the louver film. Thus, when the polarizing layer 6 is provided in the louver film 4, the imaging unit 2 can suppress glare. Furthermore, when the antireflection layer 7 is provided in the louver film 4, the louver film 4 can suppress the occurrence of reflection.

The non-transmissive unit 4B of the louver film 4 extends along the horizontal direction in the imaging device 1. Thus, it is possible to obtain an effect of reducing stray light from the vertical direction, such as external light and a reflection of the dashboard.

The imaging device 1 is mounted on a vehicle. Thus, it is possible to effectively reduce stray light entering the imaging unit 2 from the outside of the vehicle.

EXAMPLES

Next, examples of the present invention will be described. However, the present invention is not limited to the examples described below.

Figure 4:
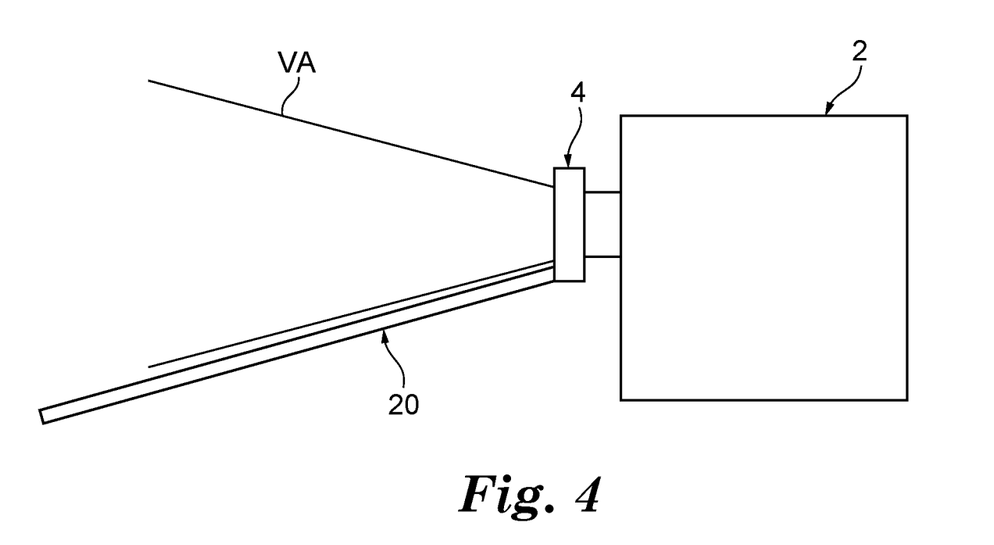
FIG. 4 is a schematic diagram illustrating a configuration of an imaging device used in examples and comparative examples.
Figure 5:
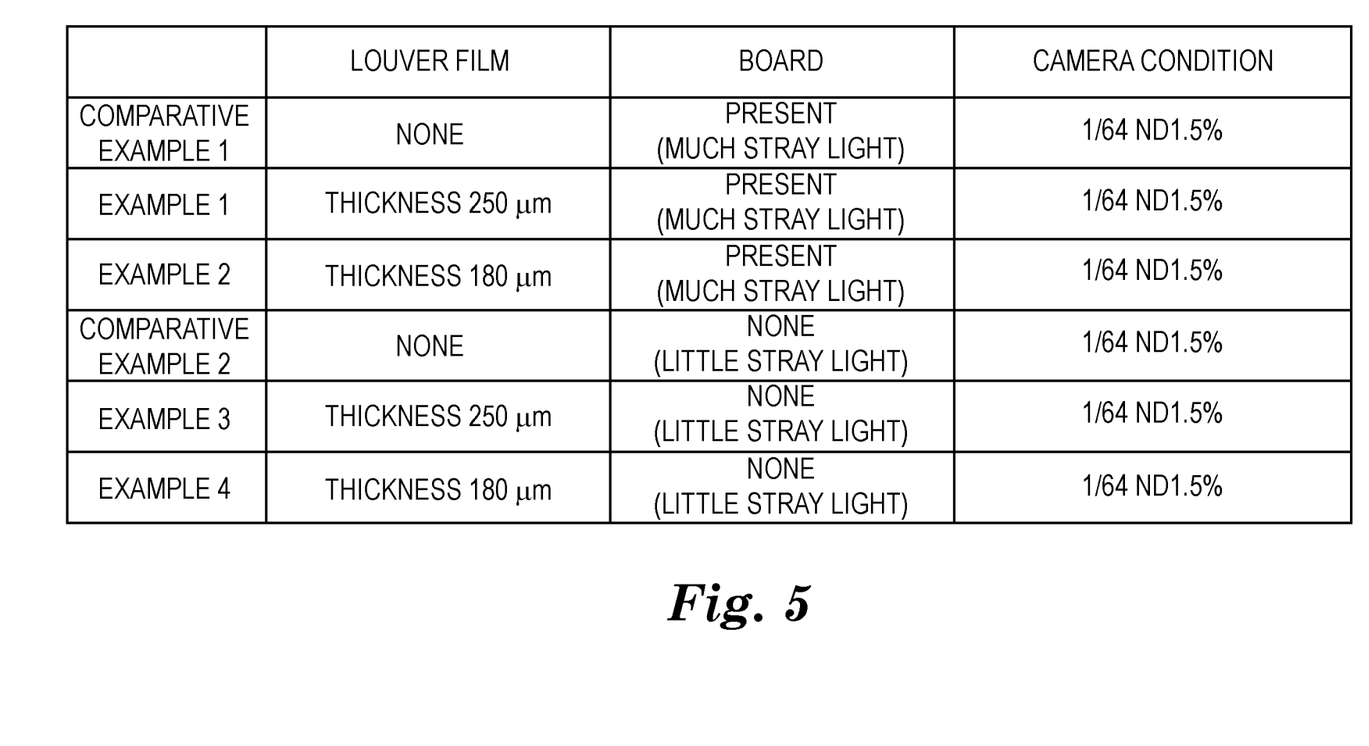
FIG. 5 is a table showing conditions for the imaging devices according to the examples and comparative examples.

An imaging device as illustrated in FIG. 4 was prepared for an imaging device according to Example 1. Furthermore, conditions for each example are shown in FIG. 5. In the imaging device according to Example 1, the louver film 4 was placed directly on a lens part of the imaging unit 2. A two-dimensional color luminance meter (CA-2000, manufactured by Konica Minolta Corp.) was employed for the imaging unit 2. A 3M™ light control film manufactured by 3M Japan Limited, was used for the louver film 4. A louver film precursor was formed of a transmissive unit 4A having a width of 76 μm and a non-transmissive unit 4B having a width of 6 μm. After the louver film precursor was sliced into a thickness of 250 μm, the louver film 4 was created by laminating a polycarbonate film having a thickness of 100 μm on both front and rear surfaces of the louver film precursor by using an ultraviolet-curable adhesive having a thickness of 20 μm. Furthermore, in order to intentionally increase the amount of stray light, a board 20 made of white paper was placed near a lower boundary of the visual field VA of the imaging unit 2. Note that a state of a camera of the imaging unit 2 was given in FIG. 5. Note that "1/64" means that the shutter speed is 1/64. "ND 1.5%" means that the transmittance of the neutral density filter is 1.5%. An imaging device as described above was used in Example 1.

An imaging device in which the louver film 4 was a 3M™ light control film manufactured by 3M Japan Limited was prepared for Example 2. A louver film precursor was formed of a transmissive unit 4A having a width of 76 μm and a non-transmissive unit 4B having a width of 6 μm. After the louver film precursor was sliced into a thickness of 180 μm, the louver film 4 was created by laminating a polycarbonate film having a thickness of 100 μm on both front and rear surfaces of the louver film precursor by using an ultraviolet-curable adhesive having a thickness of 20 μm. This louver film 4 had a thinner thickness than that in Example 1 and the angle of view was widened. The other conditions in Example 2 were similar to Example 1. For Example 3, an imaging device was prepared in which the board 20 was omitted. The other conditions in Example 3 were similar to Example 1. For Example 4, an imaging device was prepared in which the board 20 was omitted. The other conditions in Example 4 were similar to Example 2. For Comparative Examples 1 and 2, an imaging device was prepared in which the louver film 4 was omitted. The other conditions of Comparative Examples 1 and 2 were similar to Examples 1 and 2, respectively.

Figure 6:
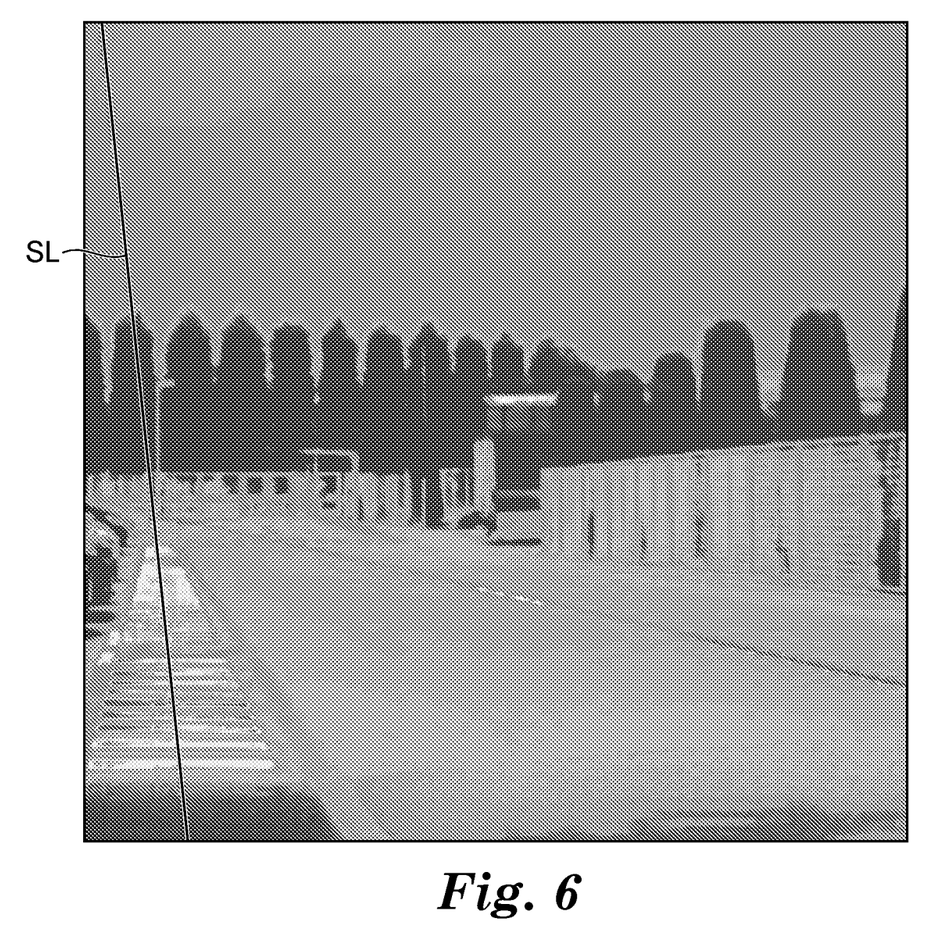
FIG. 6 is an image photographed by the imaging device according to the examples and comparative examples.
Figure 7:
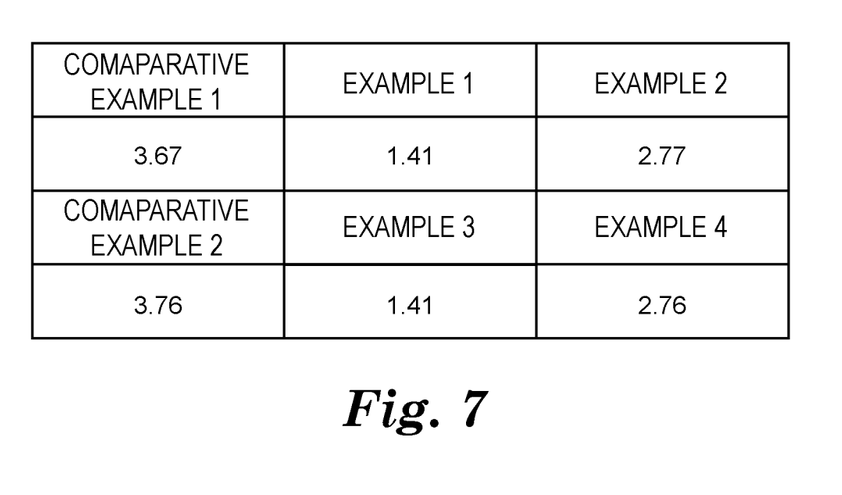
FIG. 7 is a table showing measurement results of the imaging devices according to the examples and comparative examples.

An image of a scenery illustrated in FIG. 6 was captured using the imaging device in Examples 1 to 4 and Comparative Examples 1 and 2. A pedestrian crossing is captured within the scenery. The pedestrian crossing includes white lines and grey lines of the asphalt placed alternately. Thus, when the brightness distribution of a reference line SL passing through the pedestrian crossing in FIG. 6 is drawn on a graph, the graph of the brightness distribution has a pattern in which an upper limit peak and a lower limit peak are alternating. A graph of the brightness distribution as mentioned above was acquired from an image obtained by the imaging devices in Examples 1 to 4 and Comparative Examples 1 and 2, five patterns of the upper limit peak and the lower limit peak of the graph were extracted from the same position on the pedestrian crossing, and a contrast between the upper limit peak (white line) and the lower limit peak (asphalt line) was calculated for the range. The calculation results are shown in FIG. 7.

In the comparison of the results of Example 1 and Example 3, the contrast has the same value, regardless of the amount of stray light. In the comparison of the results of Example 2 and Example 4, the contrast has substantially the same value, regardless of the amount of stray light. On the other hand, in the comparison of Comparative Examples 1 and 2, the contrast has decreased in Comparative Example 1 where the amount of stray light is large. From these results, it can be understood that the stray light entering the imaging unit can be decreased by placing the louver film in front of the imaging unit.

REFERENCE NUMERALS

1 Imaging device,
2 Imaging unit,
4 Louver film,
4A Transmissive unit,
4B Non-transmissive unit,
6 Polarizing layer,
7 Antireflection layer,
100 Vehicle.

The invention claimed is:

1. An imaging device comprising:
a camera configured to capture an image; and
a louver film placed in a visual field of the camera, and separate from the camera, the visual field extending no greater than plus or minus 45 degrees from an optical axis of the camera, the louver film having a light transmissive unit and a non-transmissive unit which are alternately placed at fixed intervals in a first direction but not in a second, orthogonal direction, the non-transmissive unit extending into the louver film to a depth that is less than a thickness of the louver film and each non-transmissive unit extending in parallel to each other non-transmissive unit along the second direction, wherein
the camera and the louver film are placed so that the optical axis of the camera intersects a principal plane of the louver film such that the non-transmissive units extend in the second direction such that they are substantially perpendicular to the optical axis, the visual field defined over a predetermined angular range along the first direction with respect to the optical axis, the non-transmissive units of the louver film substantially allowing the transmitting of light therethrough from a direction substantially parallel to the non-transmissive units and within the predetermined angular range, and substantially blocking light at an angle outside of the predetermined angular range in the first direction, but substantially not blocking light arriving from the second direction;
wherein an antireflection layer is provided on a principal plane placed on an opposite side of the camera of principal planes of the louver film.

2. The imaging device according to claim 1, wherein, as seen from a direction perpendicular to an array direction of the transmissive unit and the non-transmissive unit and a light transmission direction of the louver film, the louver film is placed in a curved state allowing the louver film to be closer to the camera as farther away from the optical axis toward the outer peripheral side.

3. The imaging device according to claim 1, wherein the non-transmissive unit of the louver film extends along a horizontal direction.

4. The imaging device according to claim 1, wherein the imaging device is mounted on a vehicle.

* * * * *